United States Patent [19]

D'Andolfo et al.

[11] Patent Number: 4,855,099

[45] Date of Patent: Aug. 8, 1989

[54] SINGLE STAGE PROCESS FOR PRODUCING CONTINUOUS POLYESTER-BASED MULTIFILAMENT YARNS AT HIGH SPEED

[75] Inventors: Francesco D'Andolfo, Cesano Maderno; Fulvio Grampa, Busto Arsizio, both of Italy

[73] Assignee: Snia Fibre s.p.a., Cesano Maderno, Italy

[21] Appl. No.: 942,932

[22] Filed: Dec. 22, 1986

Related U.S. Application Data

[63] Continuation of Ser. No. 688,150, Dec. 31, 1984, abandoned.

[30] Foreign Application Priority Data

Dec. 30, 1983 [IT] Italy ................................ 24454 A/83

[51] Int. Cl.⁴ ........................ D01D 5/092; D01F 6/62
[52] U.S. Cl. ................................... 264/103; 264/130; 264/129; 264/210.8; 264/211.15
[58] Field of Search ............ 264/103, 290.7, DIG. 75, 264/211.15, 130, 129

[56] References Cited

U.S. PATENT DOCUMENTS

| 2,604,667 | 7/1952 | Hebeler ........................... 264/210.8 |
| 3,996,324 | 12/1976 | Landenberger et al. ........... 264/103 |
| 4,237,187 | 12/1980 | Raybon, Jr. et al. ............... 264/103 |

FOREIGN PATENT DOCUMENTS

| 2615246 | 4/1976 | Fed. Rep. of Germany . |
| 2277913 | 7/1975 | France . |
| 0012327 | 1/1977 | Japan ................................ 264/103 |

*Primary Examiner*—Hubert Lorin
*Attorney, Agent, or Firm*—Wenderoth, Lind & Ponack

[57] ABSTRACT

A method of producing continuous multifilament yarns of polyethylene terephthalate comprising the steps of extruding the polymer in the molten state, cooling the filaments by blowing, and application of dressing, interlacing and winding. The polymer viscosity is in the range of 0.52 to 0.82. The filaments, on exiting the die, meet a conduit which protects them against air streams. Winding is carried out at rates in the range of 3,500 to 5,500 meters/minute. The fiber yielded by the method has a modulus in the 300 to 500 cN/tex range, tenacity in the range of 30 to 40 cN/tex, ultimate elongation varying from 50% to 80%, and shrinkage in water of between 3% and 8%.

5 Claims, 1 Drawing Sheet

SINGLE STAGE PROCESS FOR PRODUCING CONTINUOUS POLYESTER-BASED MULTIFILAMENT YARNS AT HIGH SPEED

This application is a continuation, of now abandoned application Ser. No. 688,150, filed Dec. 31, 1984 now abandoned.

BACKGROUND OF THE INVENTION

1. Field of the invention

This invention relates to a method of producing multifilament polyester yarns, by spinning in the molten state and winding at a high speed, and in particular, to a spinning method of a direct type in a single stage and filaments obtained thereby.

2. Prior art

Traditional continuous polyester filament production processes are usually of a two-stage type: a first so-called "spinning" stage wherein the polyester polymer is fed in the molten state into one or more dies through a suitable extruder, thereafter the filaments exiting the die orifices are cooled and solidified, and then are suitably oiled and towed by a spinning roller at a peripheral speed on the order of 1,000 meters/minute.

The yarn is then passed through a second stage, called the "stretching" stage, wherein using the speed differential between the first spinning roller and in the next, properly termed the stretching one, the yarn is subjected to elongation with respect to the starting length value which it had on exiting the first stage, on the order of 300% to 400%.

The two steps just described may take place on either of two separate apparata or a single apparatus; the former instance is that of separate spinning and stretching, the latter is that of continuous spinning and stretching. Modern production machinery usually operate in the continuous spinning and stretching mode and achieve picking speeds in the range of 3,000 to 3,500 meters/minute.

It has been already proposed in prior publications eliminate the stretching stage and picking directly at such speeds, and at even higher speeds, the polyester yarn.

Such prior publications, however, fail to fully solve the problems connected with the elimination of the stretching stage and consisting respectively of inadequate textile characteristics of the resulting yarns and difficulties which accompany operation of the picking machinery in the complete absence of spinning rollers. In some cases elimination of the stretching has been suggested but not of both the spinning rollers as usually employed, the presence of at least one of them being in all cases regarded as necessary, because by suitably controlling the peripheral speed of such a spinning roller relative to that at which picking is carried out, correct copping speeds can be achieved to form yarn cops which can be used in subsequent processing.

In other cases that spinning roller also serves, owing to its being heated, the function of a device adapted to fix the oncoming yarn from spinning to improve some ot its otherwise irregular characteristics, such as recovery.

Currently available are picking assemblies which operate at an operating speed in excess of 3,500 meters/minute as previously specified, and in particular which operate up to about 5,500 meters/minute without any particular trouble of a strictly mechanical nature.

With the aid of such picking machinery, therefore, it is highly desirable to have a processing method available which can avoid the need for using, to obtain suitable yarn packages for subsequent textile processing, at the same time deflection spinning rollers of any kind, and particularly of the heated type. This is because of the costs connected both with the purchase of such additional machinery and the burden connected with its operation.

Other prior publications indicate that in the speed range from 3,500 to 5,500 meters/minute owing to phenomena connected with the molecular structure of yarns, in particular crystallinity and orientation (wherewith the yarn birefrigence value is associated), dye-taking ability is irregular. However, the suggestions proposed do not solve that problem.

In general, none of the available teachings in literature allow for operation of the spinning and picking lines in a single stage and without spinning rollers, it being satisfactory for industrial practice that the problems of yarn quality, breakages of the yarn during copping, and high rate of waste and rejected yarn connected with such productions.

Such problems are particularly enhanced in the instance of the production of yarns of so-called non-circular cross-section from a polymer lacking opacifier substance of the so-called lustre type.

The Applicant has unexpectedly found that the aforementioned problems can be solved and overcome, and that it is possible to obtain yarn with assigned properties and suitable for subsequent textile processing with a direct spinning process at picking speeds in the range from 3,500 to 5,500 meters/minute.

SUMMARY OF THE INVENTION

It is a primary object of this invention to provide a method for the production of continuous multifilament yarns of single-stage polyethylene terephthalate and without deflecting spinning rollers, comprising at least the steps of extruding the polymer in the molten stage thorugh dies to form filaments, cooling the filaments by blowing, applying a dressing thereto, interlacing the filaments and picking, wherein:
 the polymer inherent viscosity is in the range of 0.52 to 0.82;
 directly below the die plane and over a distance ranging from 30 to 50 cm, or preferably 35 to 45 cm, the filaments are passed through a medium unaffected by air streams and maintained at an assigned temperature;
 said temperature lies in the range of 60° to 80° C. range;
 application of said dressing is carried out through an nozzle/thread guide arrangement and gathers the filament bundle(s) into one or more single filaments;
 said nozzle arrangement is located at a distance not exceeding 100 cm from the die plane and preferably at 60 to 70 cm therefrom;
 the yarn winding up is effected at speeds in the range of 3,500 to 5,500 meters/minute.

By proceeding as specified, polyester yarns are obtained which, in addition to the regularity normally required of products of this type, have the following specific characteristics:
 module, as CN/tex, as in the range of 300 to 500;
 tenacity, as CN/tex, in the range of 30 to 40;
 breaking elongation in the range of 50% to 80%;

shrinkage in water on boiling in the range of 3% to 8%.

It is only by working in accordance with the directions of this invention that it becomes possible to obtain tensions at the picking area in the range of 0.2 to 0.6 g/den and such as to permit for a correct formation of the packages and such as to impart to the yarn upstream of winding a sufficient number of interlacings in the range of 5 to 25 knots per meter with the devices normally employed in the pertinent art to such production.

DETAILED DESCRIPTION OF THE PREFERRED EMBODIMENTS

Figure 1:
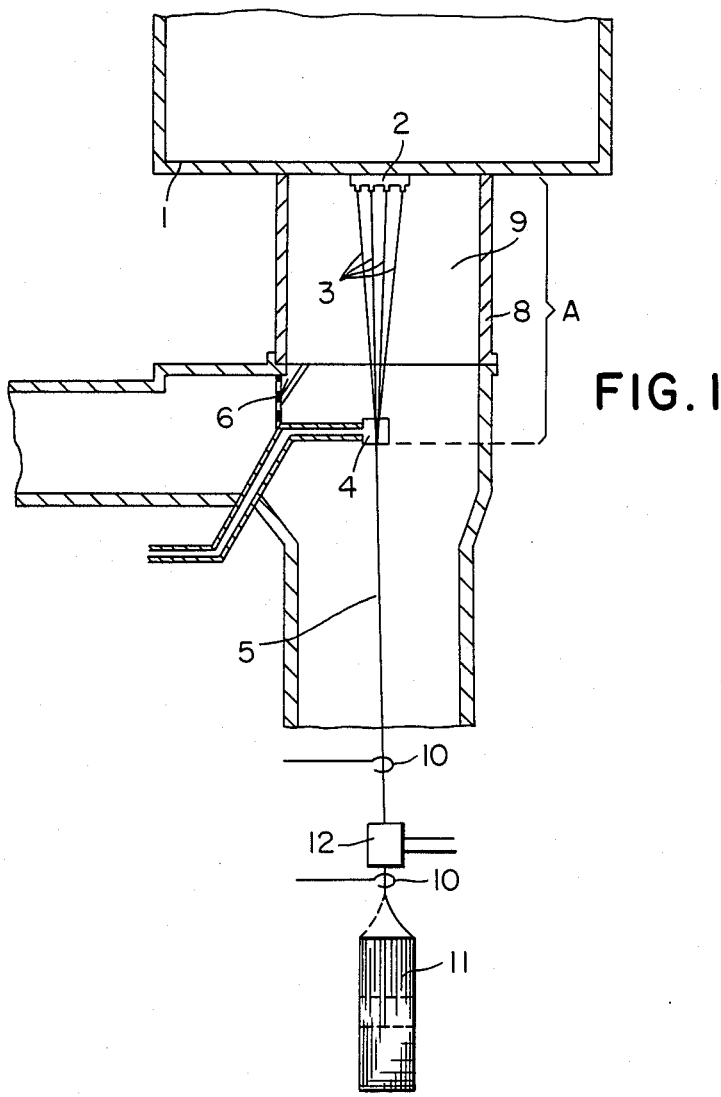
FIG. 1 is a sectional front view of a schematic spinning station for carrying out the method of the present invention in its preferred embodiments.

This invention will be more clearly understood by making reference to the following examples and accompanying figure which shows a sectional front view of a schematic spinning station.

The line 1 therein identifies the plane of the die(s) 2 whence the filaments of the individual filaments 3 emerge which are gathered by the finish device 4 into a single dilament 5; in the section included between the plane of the dies 1 and blow cooling device 6, shown in section hatched, there is interposed a circuit 8, in this figure having a circular cross-section, but may have any desired cross-section, so as to confine the area 9 where the filament bundles are to be subjected to no perturbation from air streams; the finish device 4 is located at the distance "A" from the die plane; the filament 5, successively guided by the feeding fingers 10 is interlaced by the device 12 and wound in the form of a cop 11.

To achieve the objective of this invention the sleeve 8 may be provided with appropriate means of removing and supplying heat such as to provide in the space bounded thereby and affecting the filaments, the conditions provided by the invention itself.

Reference is also made to the accompanying Table 1.

Interlacing imparts 5 to 25 knots per meter, and preferably 8 to 15 knots per meter.

EXAMPLE 1

A 50 dtex count 16-filament yarn has been obtained through spinning by melting a polyethylene terephthalate-based polymer having an inherent strating viscosity of 0.63, said polymer has been extruded at a temperature of 290° C. through dies having a 52 mm diameter and provided with 16 orifices, each having a diameter of 0.25 mm and capillary height of 0.50 mm.

From each spinning station four groups of 16-filament threads were extruded.

Below the die plane an area was provided where the filaments were unperturbed by air streams, as implemented by inserting a conduit having a 30 cm diameter below which began the thread cooling area by blowing. The overall height of said conduit was 33 cm. The temperature inside said conduit at the point of filament passage has been measured under conditions simulating the operating conditions, by interrupting the extrusion instantaneously and measuring 15 seconds from said interruption the temperature at a point located in the thread path. The temperature measured at a point located 15 cm away from the die plane was 65° C.

The finish device comprising a double tier of opposed nozzles fed with an aqueous finish emulsion to 30% in oil was placed in a distance of 700 mm from the die plane.

Subsequently, the thread was passed through a set of thread guides, and taken, with a tension of 0.5 grams per dtex, to the interlacing area which comprised a commericial sintered ceramic nozzle fed under a pressure of 5 atmospheres.

Picking showed no problems of any kind, the package configurations were regular, and spinning did not suffer interruptions due to breakage of filaments.

Picking speed was 4,000 meters/minute.

The yarn characteristics are shown in Table I under column 1.

EXAMPLE 2

By proceeding in a similar way as specified in Example 1, yarns are produced at the picking rate of 5,000 meters/minute instead of that indicated in Example 1.

EXAMPLES 3 AND 4

With a similar procedure to that indicated in the preceding example, but using a different extrusion temperature equal to 287° and 285° C., respectively, a 24-filament, 78 dtex count yarn is picked, and in this instance the dies had not a circular but a three-lobe type of cross-section.

EXAMPLE 5

The same procedure as in Example 2 was followed, excepting that, by comparison, the conduit which protected the yarn issuing from the die against air streams was not used.

The yarn tension was increased to 0.8 g/dtex and tenacity decreased to 28 cN/tex.

The yarn winding into cops was irreuglar and the number of 2 knots per meter was low.

EXAMPLE 6

The same procedure as in Example 4 was followed, except that, by comparison, the distance of the die plane from the finish nozzle was 1,100 mm.

The cop winding showed to be irregular, and the cohesive factor was 0; hence, the thread is not interlaced and is unsuitable for subsequent processing.

The yarn tension is particularly high and equal to 1 gram/dtex.

Reference is now made to Table II which illustrates Example 7 to 12, wherein a starting polymer having an inherent viscosity of 0.70 was used.

EXAMPLE 7-10

Examples 7-10 reveal a regular winding of the cops and reduced tension on the threads, while the number of knots per meter remains below 10.

EXAMPLE 11

Similarly to Example 5, no conduit to protect filaments against air streams is used.

Only 4 knots per meter are obtained, and the yarn cops are wound in an irregular fashion.

EXAMPLE 12

Similarly to Example 6, the distance from the die plane to the finish nozzles was 1,100 mm.

Cop winding is irregular and the cohesive factor is 1.

From the Examples it may be appreciated that at the high winding rates used, only the method disclosed by this invention enables the tension on the yarn to be maintained within acceptable values for a satisfactory interlacing and winding of the cops.

In particular, operation with finish nozzles placed too far from the dies, or operation without the yarn protection conduit during the initial portion of their path, results in an unacceptable increase in the tensions which are incompatible with a satisfactory interlacing and winding.

TABLE I

| EXAMPLE No. | 1 | 2 | 3 | 4 | 5 | 6 |
|---|---|---|---|---|---|---|
| DISTANCE FROM DIE PLANE TO FINISH NOZZLES (mm) | 700 | 600 | 750 | 600 | 600 | 1100 |
| THREAD TENSION (g/dtex) | 0.5 | 0.6 | 0.6 | 0.6 | 0.8 | 1 |
| EXTRUSION TEMPERATURE (°C.) | 290 | 288 | 287 | 285 | 288 | 285 |
| PICKING SPEED (m/min) | 4000 | 5000 | 4000 | 5000 | 5000 | 5000 |
| COUNT/FILAMENTS (dtex) | 50/16 | 50/16 | 78/24 | 78/24 | 50/16 | 78/24 |
| FILAMENT CROSS-SECTION | circular | circular | three-lobe | three-lobe | circular | three-lobe |
| TENACITY (cN/tex) | 30 | 32 | 30 | 33 | 28 | 32 |
| STARTING ELASTIC MODULE (cN/tex) | 300 | 344 | 308 | 356 | 300 | 380 |
| ELONGATION (%) | 80 | 63 | 78 | | 58 | 54 |
| SHRINKAGE IN WATER ON BOILING (%) | 7.8 | 4.8 | 6.9 | 3.7 | 4.8 | 3.5 |
| COHESIVE FACTOR (knots/meter) | 10 | 8 | 15 | 12 | 2 | 0 |
| COP SHAPE | regular | regular | regular | regular | irregular | irregular |

TABLE II

| EXAMPLE No. | 7 | 8 | 9 | 10 | 11 | 12 |
|---|---|---|---|---|---|---|
| DISTANCE FROM DIE PLANE TO FINISH NOZZLES (mm) | 700 | 600 | 750 | 600 | 600 | 1100 |
| THREAD TENSION (g/dtex) | 0.4 | 0.5 | 0.5 | 0.6 | 0.7 | 0.9 |
| EXTRUSION TEMPERATURE (°C.) | 300 | 298 | 297 | 295 | 298 | 295 |
| PICKING SPEED (m/min) | 4000 | 5000 | 4000 | 5000 | 5000 | 5000 |
| COUNT/FILAMENTS (dtex) | 50/16 | 50/16 | 78/24 | 78/24 | 50/16 | 78/24 |
| FILAMENT CROSS-SECTION | circular | circular | three-lobe | three-lobe | circular | three-lobe |
| TENACITY (cN/tex) | 32 | 35 | 33 | 36 | 36 | 37 |
| STARTING ELASTIC MODULE (cN/tex) | 320 | 404 | 338 | 426 | 416 | 432 |
| ELONGATION (%) | 76 | 72 | 80 | 71 | 67 | 74 |
| SHRINKAGE IN WATER ON BOILING (%) | 7 | 4.1 | 6.5 | 3.7 | 5 | 4.6 |
| COHESIVE FACTOR (knots/meter) | 11 | 10 | 16 | 11 | 4 | 1 |
| COP SHAPE | regular | regular | regular | regular | irregular | irregular |

We claim:

1. A method for producing continuous multifilament yarns of polyethylene terephthalate in a single stage and without deflecting spinning rollers, comprising at least the steps of extruding molten polyethylene terephthalate through dies to form filaments, cooling the filaments by blowing, applying a dressing thereto, interlacing and winding the filaments, wherein:
    said polyethylene terephthalate having an inherent viscosity in the range of 0.52 to 0.82;
    directly below the die and over a distance varying from 30 to 50 cm, the filaments being passed through a medium unperturbed by air streams and maintained at an assigned temperature;
    said temperature being in the range of 60° to 80° C.;
    said cooling by blowing being performed below said unperturbed medium and above said application of said dressing, interlacing and winding;
    the applicatin of said dressing taking place through an arrangement comprising a nozzle and thread guide whereby the filaments are gathered into a continuous multifilament yarn;
    said arrangement being placed at a distance from the die of from 60 to 70 cm; and
    said winding being carried out at a speed in the range of 3500 to 5500 meters/minute.

2. The method according to claim 1, wherein the filament tension during the interlacing step varies form 0.2 to 0.6 grams per denier.

3. The method according to claim 1, wherein said medium is surrounded by a protective conduit.

4. The method according to claim 1, wherein said cooling by blowing begins directly downstream of said medium.

5. The method according to claim 1 wherein the distance directly below the die within said filaments are passed through an unperturbed medium by air streams is from 35 to 45 cm.

* * * * *